United States Patent [19]
Satran et al.

[11] Patent Number: 5,332,338
[45] Date of Patent: Jul. 26, 1994

[54] EXCHANGEABLE HARD METAL CUTTING INSERTS IN MILLING CUTTER

[75] Inventors: Amir Satran, Kfar Havradim; Moshe Rudko, Nahariya, both of Israel

[73] Assignee: Iscar Ltd., Migdal Tefen, Israel

[21] Appl. No.: 984,160

[22] Filed: Dec. 2, 1992

[30] Foreign Application Priority Data

Dec. 16, 1991 [IL] Israel ..................... 100383

[51] Int. Cl.$^5$ ..................... B23C 5/08; B23C 5/20
[52] U.S. Cl. ..................... 407/42; 407/113
[58] Field of Search ............. 407/42, 61, 62, 63, 407/113, 114

[56] References Cited

U.S. PATENT DOCUMENTS

| | | | |
|---|---|---|---|
| 2,761,196 | 9/1956 | Graves et al. | 407/34 |
| 4,585,375 | 4/1986 | Erkfritz | 407/114 |
| 4,699,549 | 10/1987 | Shimomura et al. | 407/42 |
| 4,940,369 | 7/1990 | Aebi et al. | 407/42 |
| 5,052,863 | 10/1991 | Satran | 407/113 |
| 5,071,292 | 10/1991 | Satran | 407/116 |
| 5,078,550 | 1/1992 | Satran et al. | 407/34 |
| 5,145,295 | 9/1992 | Satran | 407/113 |

OTHER PUBLICATIONS

*Marks' Standard Handbook for Engineers*, Ninth Edition, Ed. Avallone & Baumeister 1987 McGraw-Hill pp. 13-48-13-49.

Primary Examiner—William E. Terrell
Attorney, Agent, or Firm—Pennie & Edmonds

[57] ABSTRACT

A cutting insert for a rotary milling cutter tool is described. The insert has a cutting edge defined between a cutting rake surface and a relief flank. The insert also has a base edge defined between the relief flank and a base surface. The cutting edge of the insert includes first and second successive component cutting edges which merge continuously with each other. The first and second component cutting edges have respective axial rake angles $\gamma_1$ and $\gamma_2$ with respect to an axis of rotation of the cutting tool, with $\gamma_1$ being significantly greater than $\gamma_2$. The relief flank and the component cutting edges are shaped and disposed so that the intersection of a plane passing through the rotational axis of the milling cutting tool with a surface milled by the cutting edge is substantially rectilinear.

10 Claims, 6 Drawing Sheets

———·———  STANDARD INSERT

— — — — —  INSERT WITH COMPONENT CUTTING EDGES WITHOUT RELIEF FLANK COMPENSATION

—————  INSERT IN ACCORDANCE WITH INVENTION WITH RELIEF FLANK COMPENSATION CONCEALED LINES

EXCHANGEABLE HARD METAL CUTTING INSERTS IN MILLING CUTTER

FIELD OF THE INVENTION

This invention relates to exchangeable hard metal cutting inserts for use with a rotary milling cutter, particularly for inserts for use in face milling.

BACKGROUND OF THE INVENTION

It is well known that in many milling operations it is desirable to ensure that the milling force component acting normally on the surface to be milled should be as low as possible, and this in order to avoid phenomena such as strain hardening, which render the milling operation more difficult and which reduce the life of the milling tool. A well known way of ensuring this is to use milling tools wherein the milling cutters present positive axial rake angles, the more positive the angle the greater the reduction of the milling forces acting normally on the milled surface. However, and in practice, as the magnitude of the positive axial rake angle is increased, there comes a stage when the milling force component changes its direction and instead of constituting a force which presses against the milled surface, it is transformed into a force which tends to draw the workpiece being milled from its clamping mechanism and/or to detach the cutting tool from the milling machine quill. The magnitude of the force which acts to detach the workpiece from its clamping mechanism is a function of the magnitude of the positive rake angle, and as this angle increases, so does this detaching force.

It is furthermore well known that the magnitude of these milling forces is directly proportional to the depth of milling effected during each single milling operation. As a consequence, the greater the length of milling contact between the cutting edge and the workpiece, the greater will be the milling forces.

It therefore follows that, in milling operations using milling tools having milling cutters displaying relatively highly positive axial rake angles and wherein the entire length of the cutting edge of the milling cutters is employed in each milling operation, the stability of the workpiece can be deleteriously affected and it is well known that in such cases workpieces tend to be detached from their clamping devices, and that undesirable vibrations, or "chatter", are set up in the milling cutter assembly.

Clearly, these disadvantages could be reduced by ensuring that only a portion of the overall length of the cutting edge of each milling cutter is employed during each single milling operation, but such a solution is clearly disadvantageous when, for example, in carrying out shoulder milling it would necessitate repeated successive milling operations in order to achieve the required depth of milling, and this would not only be burdensome but would, of necessity, give rise to the production of a more or less serrated, milled surface as well as reducing the overall production rate.

It is an object of the present invention to provide a new and improved insert for a milling cutter, particularly for a milling cutter used in face milling operations, wherein the above-referred-to disadvantages are substantially reduced.

BRIEF SUMMARY OF THE INVENTION

According to the present invention, there is provided a cutting insert for use with a rotary milling cutter tool and having a cutting edge defined between a cutting rake surface and a relief flank and having a base edge defined between said relief flank and a base surface wherein said cutting edge comprises first and second successive component cutting edges which merge continuously with each other; said first and second component cutting edges having respective axial rake angles $\gamma_1$ and $\gamma_2$ with respect to an axis of rotation of the cutting tool wherein $\gamma_1$ is significantly greater than $\gamma_2$; $\gamma_1$ lies substantially within the range 4°–30° and $\gamma_2$ lies substantially within the range ±15°; wherein said cutting edge projects a length a with respect to the axis of rotation, whilst the first component cutting edge projects a length $a_1$ with respect to the axis of rotation wherein $a_1$ lies within the range 0.6–0.9a and wherein said relief flank and the component cutting edges are so shaped and disposed that the intersection of a plane passing through the rotational axis of the milling cutter tool with a surface milled by said cutting edge is substantially rectilinear.

Seeing that the angle $\gamma_1$ is significantly greater than the angle $\gamma_2$, i.e. the first component cutting edge exhibits a greater positive axial rake angle than does the second component cutting edge and, as has been indicated above, cutting inserts having cutting edges with a relatively high positive axial rake angle, are subjected to cutting forces which increasingly tend to detach the cutting tool from the milling machine quill or the workpiece from its clamping device. In view of the fact, however, that the first component cutting edge having this relatively high positive axial rake angle does not extend over the whole length of the cutting edge, but is rather followed by a second component cutting edge having a smaller positive axial rake angle (in fact, the axial rake angle can even be negative up to −15°), the overall cutting forces acting on the insert are significantly reduced even when compared, for example, with the same cutting forces acting on a conventional cutting insert. Thus, with such a conventional cutting insert not exhibiting this high positive axial rake angle, the entire cutting edge length is employed in each cutting operation.

The present invention is, in fact, based on an observation that in practice with milling tools used for face milling, and in the overwhelming majority of the cases, the depth of cut does not exceed a depth corresponding to 0.6 times the length of the cutting edge. In other words, the remaining portion of the cutting edge does not, in fact, take part in the face milling operation. For the minority of cases where it is intended to effect milling over the entire length of the cutting edge and where, therefore, the generation of the axial cutting forces tends to give rise to vibrations and general instability in the cutting operations, particularly where the cutting edge has an increased positive axial rake angle, the present invention comes to ensure that operation over this residual portion of the cutting edge is effected with a cutting edge whose axial rake angle is significantly less than the positive axial rake angle of the major portion of the cutting edge lying between ±15°, and preferably zero. In this way it is ensured that, even in those cases where it is desired to use the cutting tool for effecting milling over the entire length of the cutting edge of the insert, it is possible to have an insert having, at least over its major initial portion, a relatively highly positive axial rake angle, thereby ensuring easy entrance of the insert into the metal, whilst over its minor remaining portion, the cutting edge is of significantly lesser axial rake angle which can even be negative.

BRIEF SUMMARY OF THE DRAWINGS

One embodiment of a milling cutting insert in accordance with the present invention will now be described by way of example and with reference to the accompanying drawings, in which.

DETAILED DESCRIPTION OF PREFERRED EMBODIMENT

Figure 1:
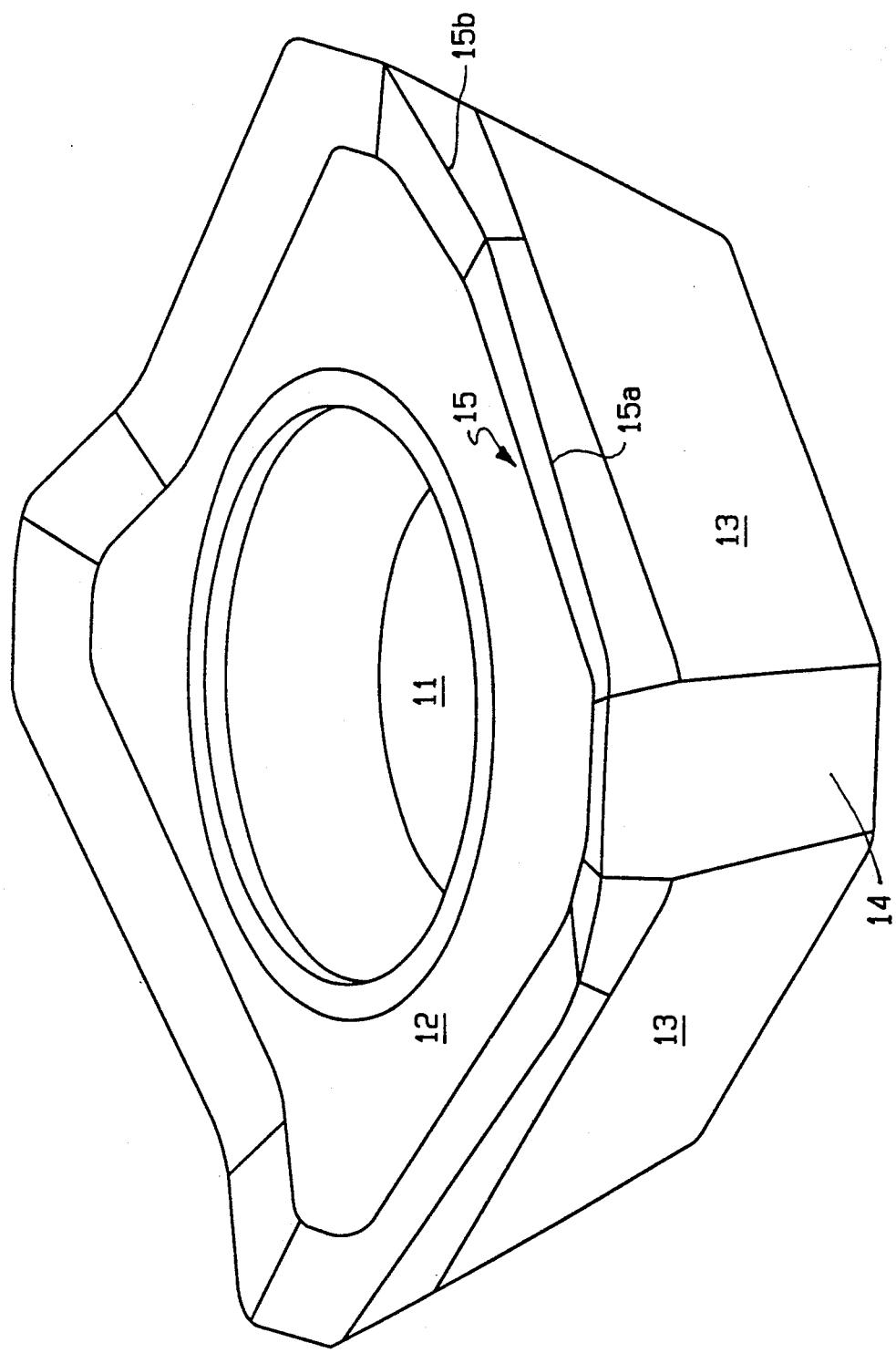
FIG. 1 is a perspective view of the insert in accordance with the invention.

As seen in the drawings, a hard metal cutting insert, for example formed of tungsten carbide, is of generally parallelepipedal shape having a central bore 11 surrounded by a peripheral upper cutting rake surface 12. The insert is formed with a planar base surface. The insert is furthermore formed with two pairs of relief flanks 13 and, at the corners, with wipers 14 of conventional construction. It will of course be realised that the corners may be merely radiused and not be provided with special wipers.

Defined between each relief flank 13 and the upper cutting rake surface 12 is a cutting edge 15 comprising successive component cutting edges 15a and 15b. As can be seen from the drawings, and in particular FIGS. 2 and 4 thereof, the insert is so formed and is so mounted in a tool holder 16 that the component cutting edge 15a defines a highly positive axial rake angle $\gamma_1$ whilst the component cutting edge 15b defines an axial rake angle $\gamma_2$ which is significantly less than $\gamma_1$ and, in the illustrated example, is substantially zero.

Figure 2:
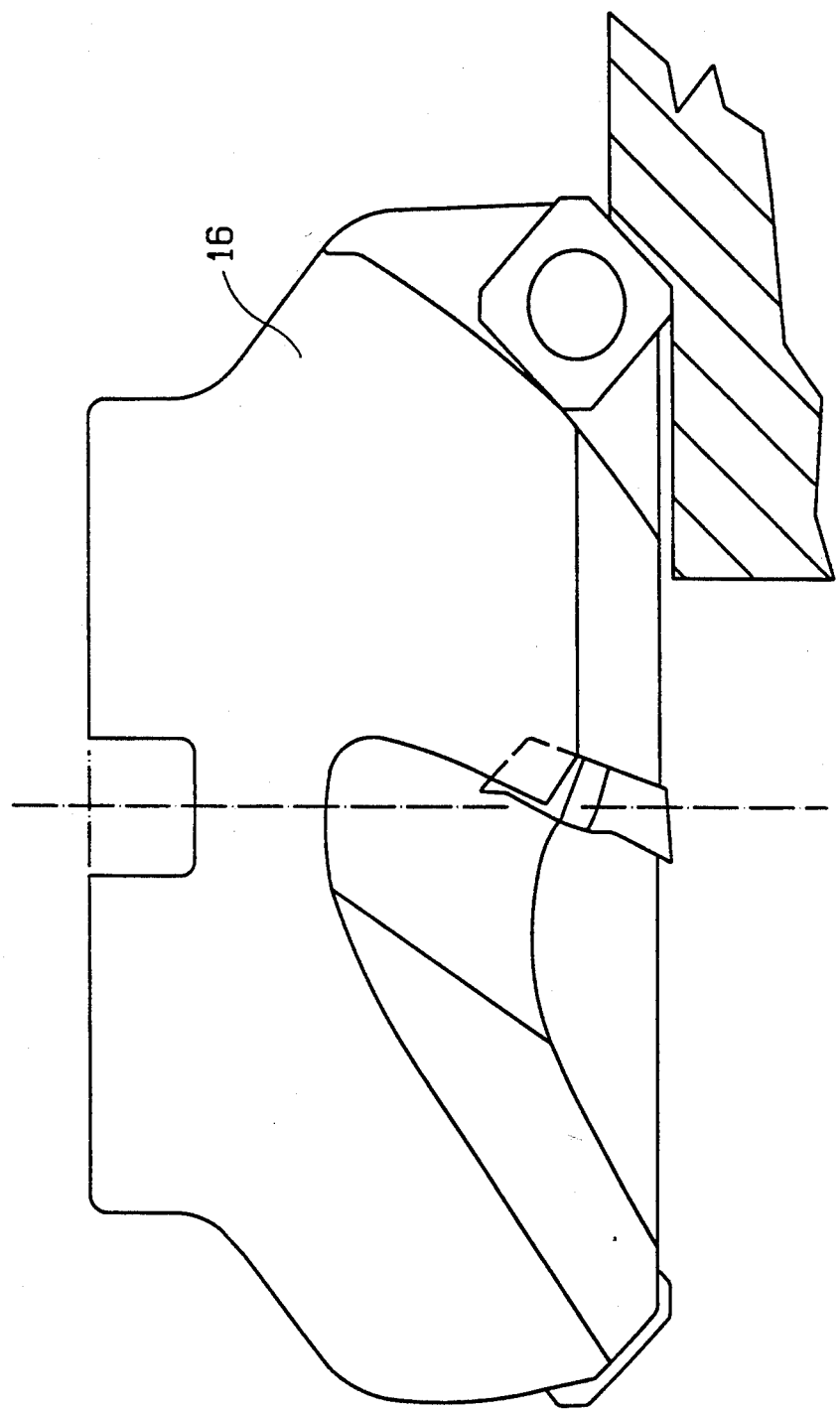
FIG. 2 is a side elevation of a milling cutter incorporating inserts as shown in FIG. 1, shown during a face milling operation.
Figure 4:
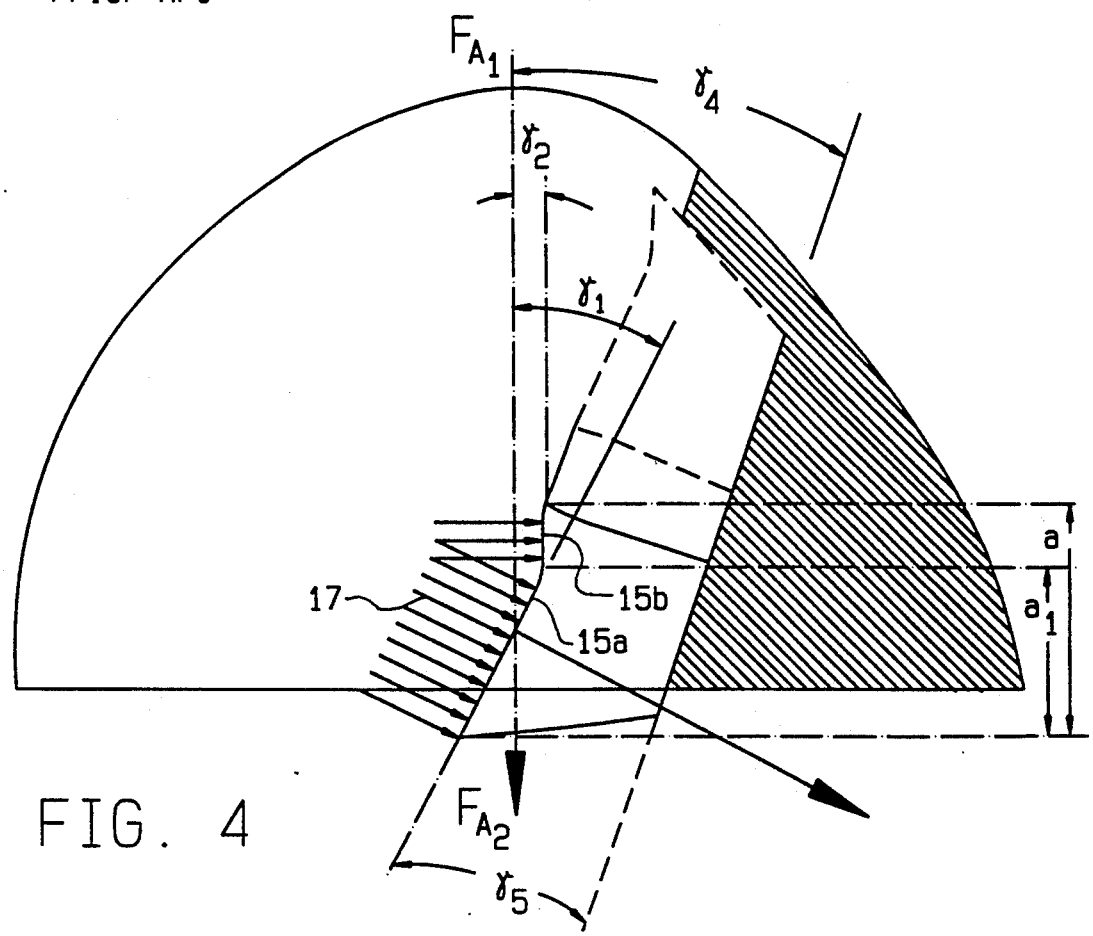
FIG. 4 illustrates schematically forces acting on a milling cutting insert in accordance with the invention.

Furthermore, and as can be seen from FIGS. 2 and 4 of the drawings, whilst the projection of the longitudinal extent of the cutting edge 15 as a whole with respect to the rotation axis equals a, the corresponding projection of the component cutting edge 15a equals $a_1$.

Figure 3:
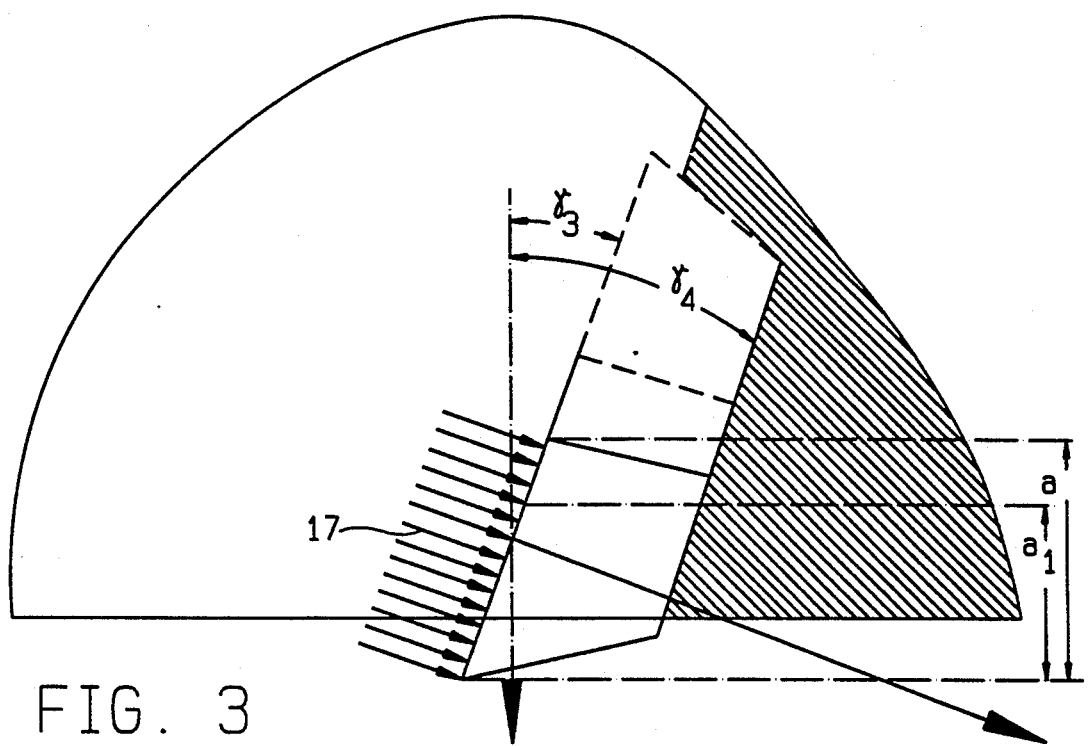
FIG. 3 illustrates schematically forces acting on a standard milling cutting insert having a positive axial rake angle.

If now we consider and compare the situation represented respectively by FIGS. 3 and 4 of the drawings, namely the situations involving respectively a standard milling insert and that involving a milling insert in accordance with the invention, we can see (in FIG. 3) that the axial rake angle presented by the cutting edge of the standard cutting insert $\gamma_3$ is less than the axial rake angle $\gamma_1$ presented by the component cutting edge 15a of the insert in accordance with the invention. In the case of the standard cutting insert as shown in FIG. 3, the forces represented by the arrows 17 act in the same direction over the entire length of the cutting edge, giving rise to a resultant force $FA_1$ which tends to detach the tool holder from the quill. It will be readily seen that this force increases with increasing axial rake angle. Thus, if one was to use the standard milling cutting insert and position it so as to represent an increased axial rake angle, i.e. having an increased axially positive rake angle, the resultant forces tending to detach the tool holder from the quill would be significantly increased.

If we now consider the situation as represented in FIG. 4 of the drawings, namely that the component cutting edge 15a presents a relatively high positive axial rake angle $\gamma_1$ immediately followed by a component cutting edge 15b of significantly reduced axial rake angle $\gamma_2$ (in the present case, e.g., an axial rake angle of zero), it will be readily seen that the component forces acting on the insert so as to tend to detach the tool holder from the quill with an increased depth of cut, are significantly reduced. In this way, it is possible to obtain the distinct advantages of milling inserts having a high positive axial rake angle without incurring the serious disadvantages which would normally be consequent thereon, namely an increased risk of detachment of the tool holder from the quill or the workpiece out of its clamping device.

For the situation wherein axial rake angle $\gamma_1$ lies in the upper regions of this range it is desirable, as shown in FIG. 4 of the drawings, that the component cutting edge 15a slopes downwardly with respect to the base of the cutting edge. In this way it is possible to accommodate inserts with high positive angles $\gamma_1$ without at the same time weakening the support provided by the tool holder. Thus, for example, and as shown in FIG. 4 of the drawings where the base of the cutting insert defines an angle $\gamma_4$ with the rotational axis of the cutting tool, and the cutting edge component 15a defines an angle $\gamma_1$ with respect to this axis, the cutting edge component 15a is inclined with respect to the insert base by an angle $\gamma = (\gamma_1 - \gamma_4)°$. Preferably, the component cutting edge 15a is inclined with respect to the base of the insert by an angle which lies substantially within the range 2°-12° (a preferred value being substantially 5°). On the other hand, the component cutting edge 15b is inclined with respect to the base of the cutting insert by an oppositely directed angle which lies substantially in the range 15°-30° (a preferred value being substantially 20°). The component cutting edge 15a can present a positive axial rake angle $\gamma_1$ which can lie within the range 4°-30°. The component cutting edge 15b, on the other hand, can present an axial rake angle $\gamma_2$ which is significantly less than $\gamma_1$ and which lies within the range ±15°. A preferred value for the axial rake angle $\gamma_1$ presented by the component cutting edge 15a is 25°, whilst the preferred value for the axial rake angle $\gamma_2$ presented by the component cutting edge 15b is 0°.

Preferably, $a_1$ lies within the range of 0.6–0.9a. A preferred value of $a_1$ equals 0.7a.

It will be appreciated that, if no steps were taken to correct the situation arising out of the division of the cutting edge into two separate component cutting edges 15a and 15b presenting differing axial rake angles $\gamma_1$ and $\gamma_2$, this would give rise, during a milling operation, to the production of a milled cylindrical or conical surface which was characterised by successive ridges, i.e. by the production of a non-smooth surface. This is in view of the fact that, when viewed in the direction of the rotational axis of the tool, the component cutting edges would not present a straight line.

In order to overcome this problem, the relief flank and, in consequence, the component cutting edges, are so shaped and positioned that the intersection of a plane passing through the rotational axis of the milling cutter tool with a surface milled by said cutting edge is substantially rectilinear.

This will now be explained with reference to FIGS. 5, 6, 7, 8a and 8b of the drawings.

Figure 6:
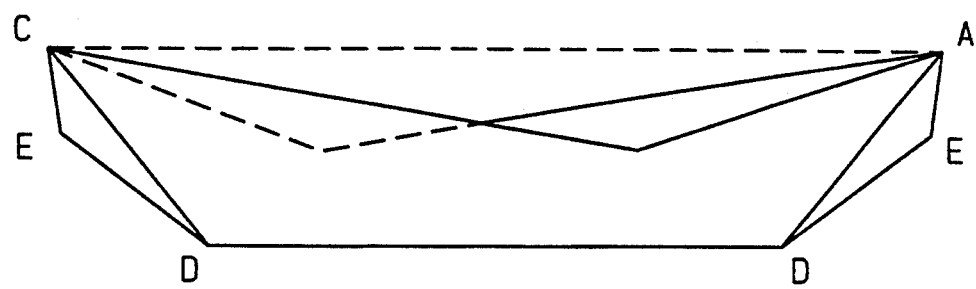
FIG. 6 is a side elevation of the insert shown in FIG. 5, also showing schematically the stages involved in proceeding from a standard insert to an insert in accordance with the invention.
Figure 5:
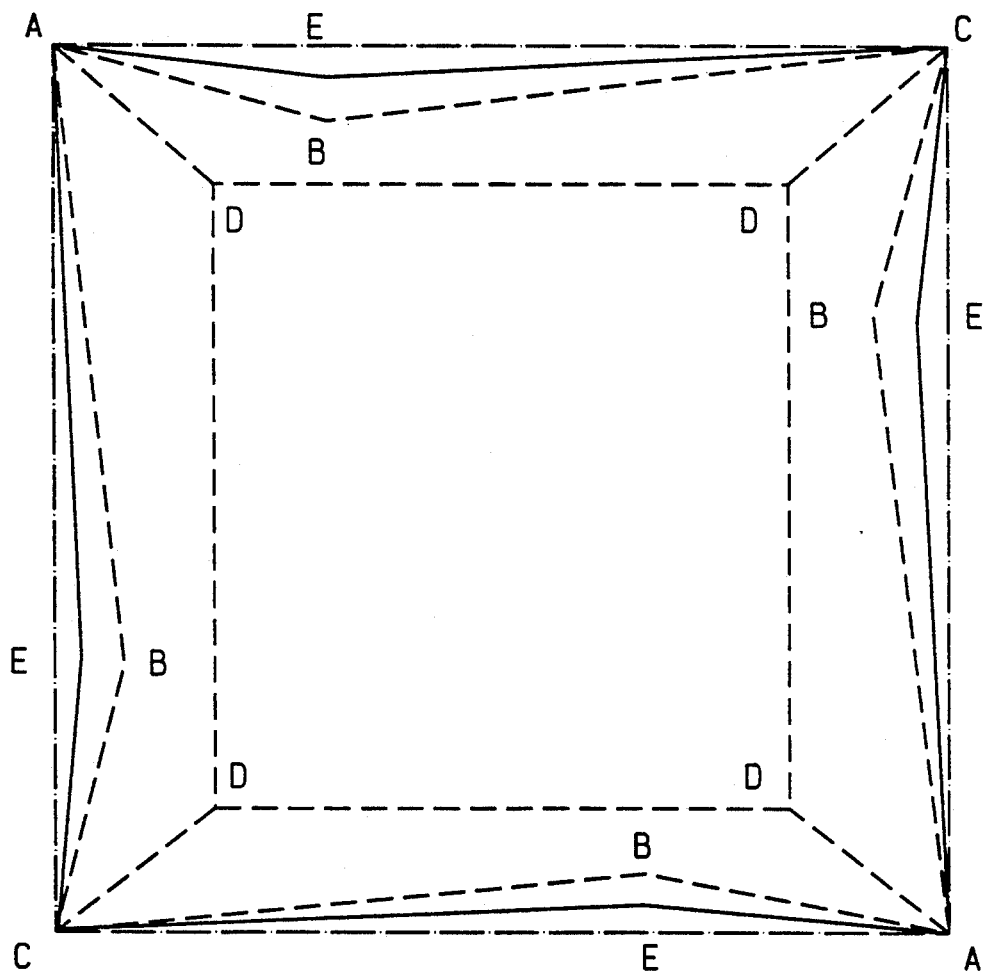
FIG. 5 is a plan view from above of a cutting insert in accordance with the invention, showing schematically the various stages involved in proceeding from a standard insert to an insert in accordance with the invention.

As can be seen in FIGS. 5 and 6 of the drawings, the cutting edge of a cutting insert of standard construction such as that, for example, shown in FIG. 3 of the drawings, is represented in chain dotted lines, with the extremities of the cutting edge represented by the letters A and C.

Figure 7:
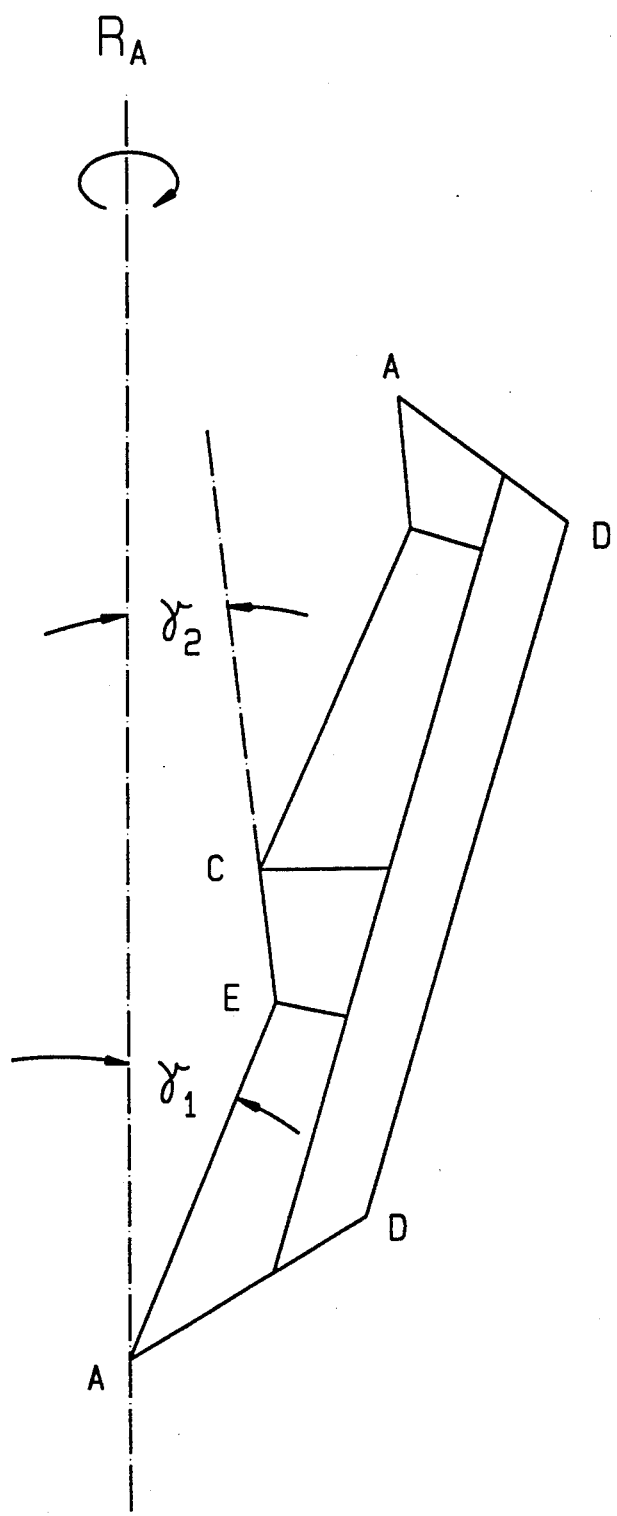
FIG. 7 shows a side elevation of an insert in accordance with the invention as mounted in a milling cutting tool designed to rotate about a rotational axis.

The cutting edge AC is subdivided into a main component cutting edge AB, and a minor component cutting edge BC, with the component cutting edge AB having an axial rake angle which is axially positive to a significantly higher degree than that of the minor component cutting edge BC. In consequence the positioning of the point B, when the cutting tool in which the cutting insert is located is rotated as shown in FIG. 7 about a rotational axis $R_A$, there will be produced a milled cylindrical or conical surface such as that shown in FIG. 8a of the drawings, which is of course not smooth but is discontinuous at a position B corresponding to the junction B of the component cutting edges of the insert.

Figure 8A:
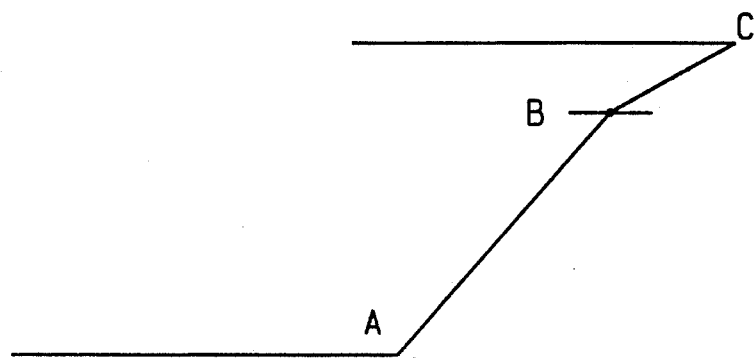
FIG. 8a shows a longitudinal sectional view of a milled surface when milled by a cutting insert having component cutting edges in accordance with the invention but without appropriate compensation of the associated relief flank.
Figure 8B:
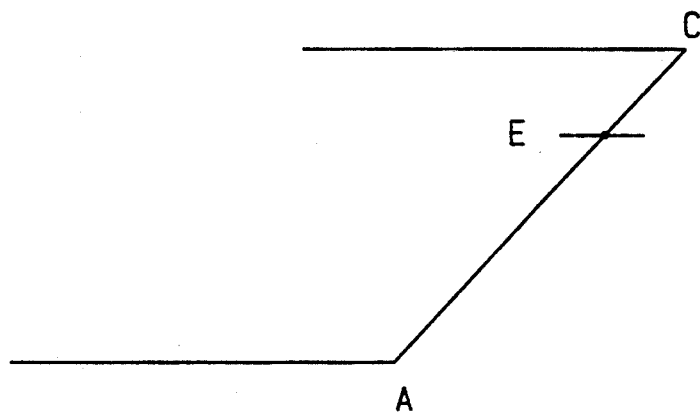
FIG. 8b shows the same milled surface as milled with a cutting insert in accordance with the invention, provided with the appropriate compensation for the relief flank surface.

In order to overcome this problem, the relief flank surfaces are rendered angularly convex, when viewed from above in plan view, in such a way that the component cutting edges and their junction point E are effectively displaced from the component cutting edges AB and BC as seen in the drawings, to the position represented by the lines AE and EC which, in fact, come very close to the straight line cutting edge of the standard insert shown in FIGS. 5 and 6 of the drawings. In this way, and as seen in FIG. 8b of the drawings, the intersection of a plane passing through the rotational axis of the milling tool with the surface milled by the cutting edge is substantially rectilinear. In other words, the point E on this surface corresponding to the position of the junction of the component cutting edges is, as can be seen, not displaced out of the plane of the milled surface.

It will be appreciated that, whilst the present invention has been specifically described with reference to milling inserts particularly for use in face milling, and of substantially parallelepipedal shape, inserts of other shapes can equally well be employed such as, for example, inserts of triangular or rhombic shape.

We claim:

1. A cutting insert in a rotary milling cutter tool and having a cutting edge defined between a cutting rake surface and a relief flank and having a base edge defined between said relief flank and a base surface wherein said cutting edge comprises first and second successive component cutting edges which merge continuously with each other; said first and second component cutting edges having respective axial rake angles $\gamma_1$ and $\gamma_2$ with respect to an axis of rotation of the cutting tool wherein $\gamma_1$ is significantly greater than $\gamma_2$; $\gamma_1$ lies substantially within the range 4°–30° and $\gamma_2$ lies substantially within the range ±15°; wherein said cutting edge projects a length a with respect to the axis of rotation, whilst the first component cutting edge projects a length $a_1$ with respect to the axis of rotation wherein $a_1$ lies within the range 0.6–0.9a and wherein said relief flank and the component cutting edges are so shaped and disposed that the intersection of a plane passing through the rotational axis of the milling cutter tool with a surface milled by said cutting edge is substantially rectilinear.

2. A cutting insert according to claim 1, wherein said axial rake angle $\gamma_1$ is substantially equal to 25°.

3. A cutting insert according to claim 1, wherein said axial rake angle $\gamma_2$ is substantially equal to 0°.

4. A cutting insert according to claim 1, wherein $a_1$ is substantially equal to 0.7a.

5. A cutting insert according to claim 1, wherein said first component cutting edge is inclined with respect to the base of the cutting insert by an angle of inclination which lies substantially in the range 2°–12°.

6. A cutting insert according to claim 5 wherein said angle of inclination is substantially equal to 5°.

7. A cutting insert according to claim 5, wherein said second component cutting edge is inclined with respect to the base of the cutting insert by an oppositely directed angle of inclination which lies substantially within the range 15°–30°.

8. A cutting insert according to claim 7, wherein said oppositely directed angle of inclination is substantially equal to 20°.

9. A cutting insert according to claim 1, wherein said insert is of substantially parallelepipedal shape.

10. A cutting insert according to claim 1, wherein corners thereof are formed with wipers.

* * * * *